United States Patent
Fritsch et al.

[19]

[11] Patent Number: 6,104,177
[45] Date of Patent: Aug. 15, 2000

[54] THREE-PHASE POWER CONTROLLER WITH INTERRUPT-CONTROLLED PHASE-GATING CONTROL

[75] Inventors: Andreas Fritsch, Kümmersbruck; Johann Seitz, Amberg, both of Germany

[73] Assignee: Siemens Aktiengesellschaft, Munich, Germany

[21] Appl. No.: 09/284,150

[22] PCT Filed: Oct. 7, 1997

[86] PCT No.: PCT/DE97/02298

§ 371 Date: Apr. 7, 1999

§ 102(e) Date: Apr. 7, 1999

[87] PCT Pub. No.: WO98/16004

PCT Pub. Date: Apr. 16, 1998

[30] Foreign Application Priority Data

Oct. 10, 1996 [DE] Germany .................. 196 41 832

[51] Int. Cl.[7] .................. G05F 5/02; H02P 7/622

[52] U.S. Cl. .................. 323/300; 318/805; 318/814

[58] Field of Search .................. 323/300; 318/767, 318/798, 805, 254, 812, 814

[56] References Cited

U.S. PATENT DOCUMENTS 5,187,419 2/1993 De Lange .................. 318/805
5,206,572 4/1993 Farag et al. .................. 318/778

*Primary Examiner*—Adolf Deneke Berhane
*Attorney, Agent, or Firm*—Kenyon & Kenyon

[57] ABSTRACT

The three-phase power controller is provided which has interrupt-controlled phase-gating control with a simple, cost-effective design. The power controller uses of a single microcontroller with only one or two interrupt inputs. This is made possible by forming voltage zero signals, whose flanks are used for interrupt control. Interrupt routines in the executive program of the microcontroller control the times when trigger signals are emitted, exclusively on the basis of the voltage zeroes as information about the three-phase mains system.

8 Claims, 12 Drawing Sheets

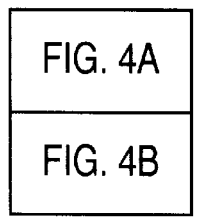
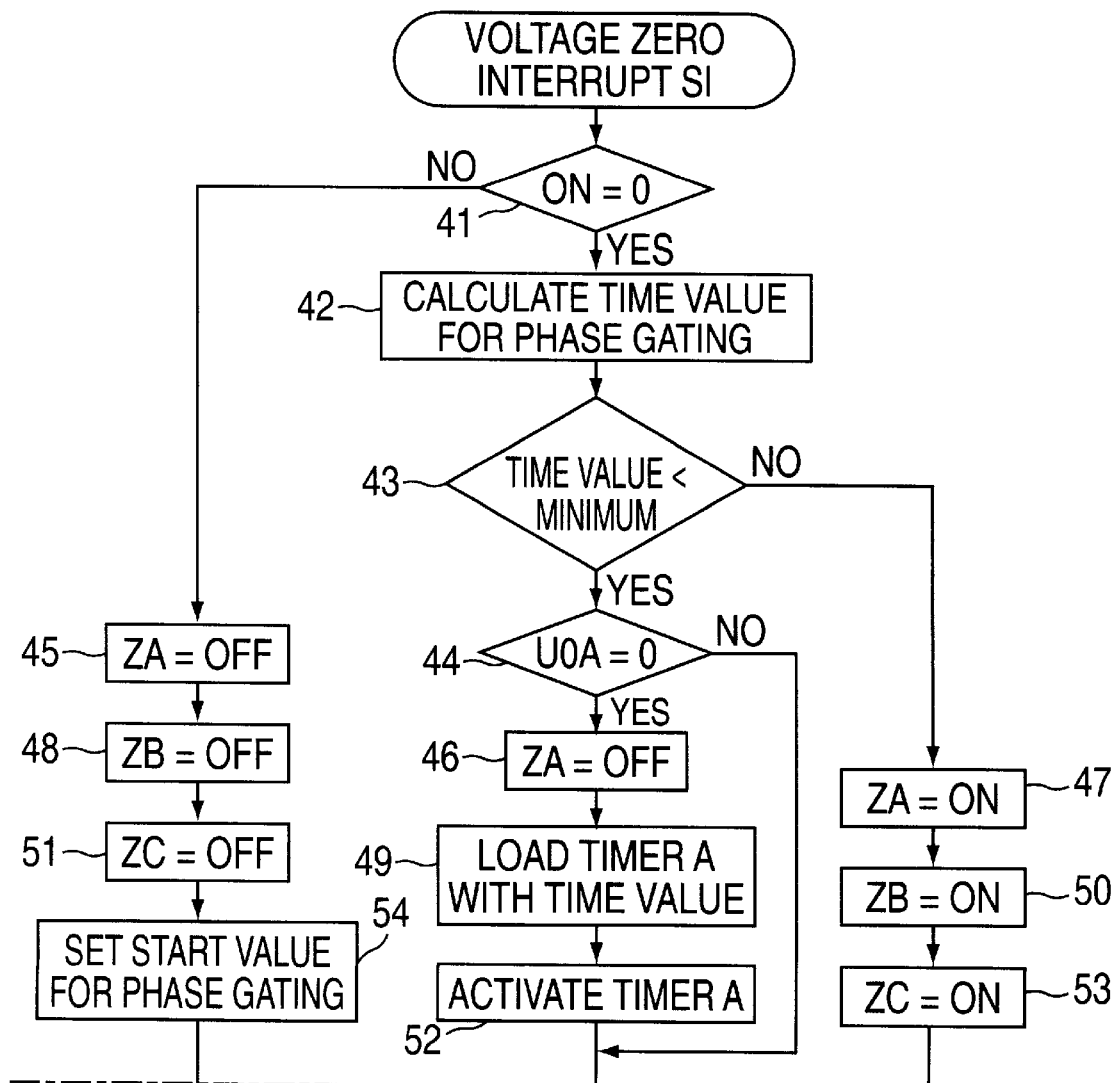

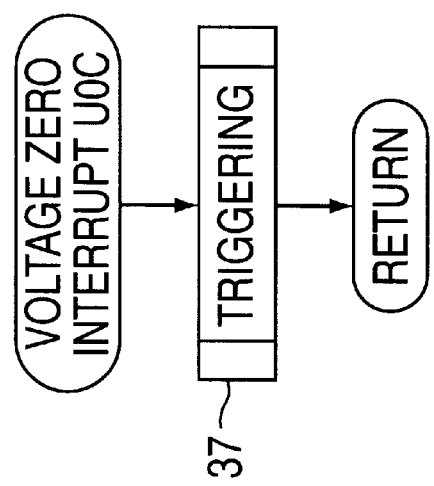
FIG. 12
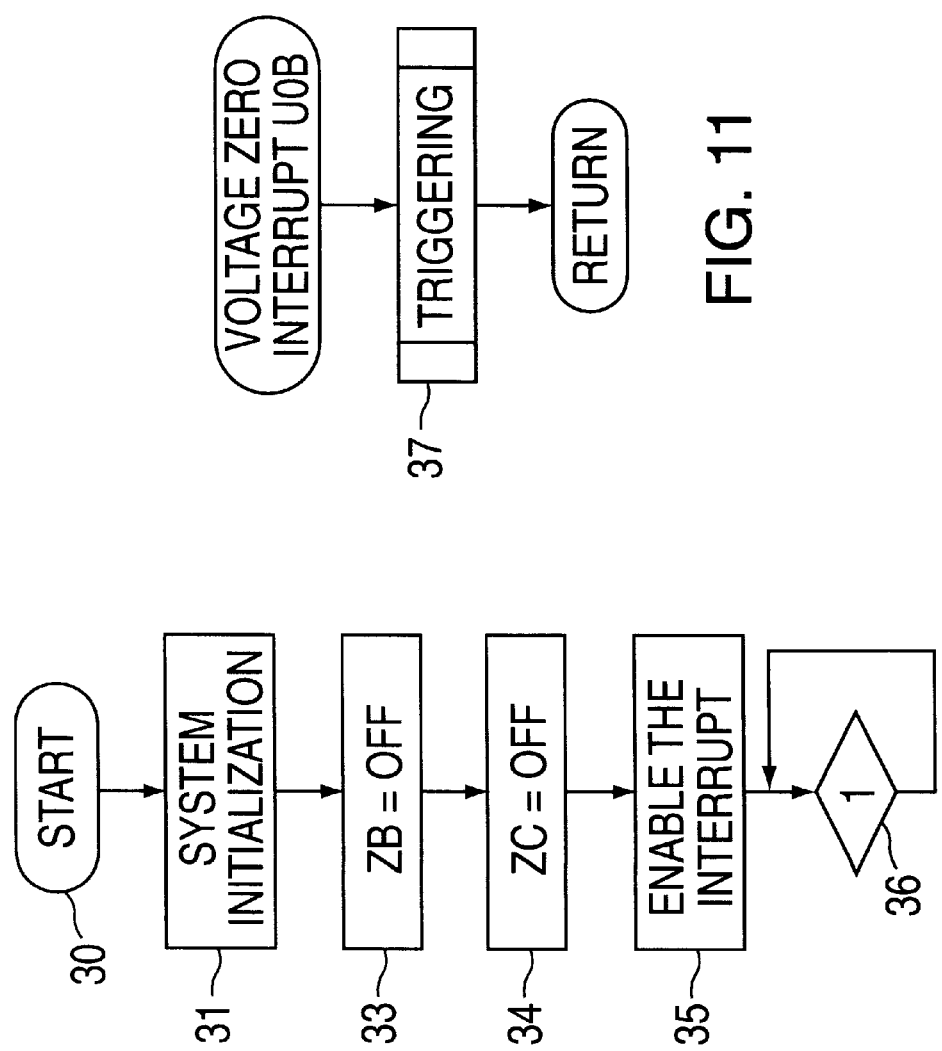
FIG. 11
FIG. 10

THREE-PHASE POWER CONTROLLER WITH INTERRUPT-CONTROLLED PHASE-GATING CONTROL

FIELD OF THE INVENTION

The present invention relates to a three-phase power controller for controlling a load which is connected to a three-phase mains system, having a microcontroller, having voltage detection devices which produce voltage zero signals which are associated with the voltage zeroes in the individual mains-system phases, from which signals the microcontroller derives trigger signals for driving phase-related semiconductor valves. The present invention furthermore relates to a method for phase-gating control of a three-phase power controller.

A three-phase power controller is described in European Patent No. 0 435 038 B1. In this case, the time at which the semiconductor valves are triggered in order to carry out phase-gating control is derived from the time difference between the voltage zero of one phase of the three-phase mains system and the switching-off of the semiconductor valve associated with this phase.

British Patent Application No. 2 084 359 describes an apparatus for controlling a three-phase asynchronous motor. To this end, controllable semiconductor valves, in particular a triac or back-to-back connected thyristors are assigned to each supply phase in the motor and allow power to be supplied to the motor in a controlled manner via phase-gating control. The time of the current zero is used as the time reference for determining the triggering times for the semiconductor valves in the conventional apparatus, this time being determined by measuring the voltage drop across the semiconductor valve. This voltage is supplied to a comparator whose output states correspond to the switching states of the semiconductor valve. The current zero then corresponds to one flank of the output signal of the comparator, from which a monoflop is used to produce a sampling pulse for a ramp voltage which is synchronized to the supply voltage zero. The sampled value of the ramp voltage is subtracted from a reference voltage, which is entered externally via a potentiometer, and is passed to the inverting input of a differential amplifier. Its output voltage is supplied together with the ramp voltage in a further comparator, which uses a downstream trigger pulse generator to produce a primary trigger signal when the ramp voltage exceeds the output voltage of the differential amplifier.

These conventional devices use the current zeroes or a combination of voltage and current zeroes in the individual phases to derive the trigger time for the semiconductor valves in three-phase power controllers. When determining the current zero, the voltage across the semiconductor valve is generally evaluated, and an ON or OFF signal is derived. In this case, the use of the voltage across the semiconductor valve may be regarded as being problematic, since this voltage is the difference between the mains-system voltages and the induced motor voltage. In the event of any voltage drops in the mains-system voltage, this difference can, for example tend to zero, which then results in the current zero not being detected.

The present invention is based on an object of providing a three-phase power controller of the type mentioned above which is particularly simple, that is to say it can be constructed using cost-effective components. Another object is to specify a method for phase-gating control of a three-phase power controller of the type mentioned above, which allows a hardware design with low costs.

The first object is achieved in that the voltage zero signals are square-wave signals whose flanks are used for interrupt control of an executive program in the microcontroller, the interrupt routines which are associated with the interrupt control in the executive program controlling the switch-on times of the trigger signals exclusively on the basis of the voltage zeroes as information about the three-phase mains system.

A particularly simple development of the present invention consists in that only two voltage detection devices are provided which produce, as voltage zero signals of two mains-system phases, square-wave signals whose flanks are used for interrupt control by the microcontroller. The microcontroller required for this purpose is of an even simpler design since it requires only two interrupt inputs, three port lines and two timers.

If a common interrupt signal, which is formed from the square-wave signals in a logic device, is supplied to the microcontroller for interrupt control, then a microcontroller with only one interrupt input is sufficient to achieve this.

BRIEF DESCRIPTION OF THE DRAWINGS

FIG 4A shows a first portion of a voltage zero interrupt routine in the interrupt-controlled method for controlling the three-phase power controller, FIG. 10 shows the initialization routine with an endless loop for the interrupt-controlled method for controlling the three-phase power controller according to FIG. 8, FIG 11 shows the voltage zero interrupt routines for a first phase for the interrupt-controlled method for controlling the three-phase power controller according to FIG. 8, FIG. 12 shows the voltage zero interrupt routines for a second phase for the interrupt-controlled method for controlling the three-phase power controller according to FIG. 8.

FIG. 1 shows a simplified circuit diagram of a three-phase power controller according to the invention, by means of which a load, which is connected to three mains-system phases A, B and C of a three-phase mains system, for example a three-phase asynchronous motor 2, can be controlled. In this case, a semiconductor valve 6A, 6B or 6C, respectively, for example a triac or a thyristor circuit comprising two back-to-back connected thyristors, is connected in each of the supply leads of the three mains-system phases A, B and C to the load 2. The semiconductor valves 6A, 6B and 6C are connected via control lines 7A, 7B and 7C to trigger devices 8A, 8B and 8C. A microcontroller 1 is connected via signal lines to the trigger devices 8A, 8B and 8C. The microcontroller 1 emits trigger signals ZA, ZB and ZC via the signal lines to the trigger devices 8A, 8B and 8C so that the semiconductor valves 6A, 6B and 6C can be driven, that is to say they can be switched on and off directly. In the present exemplary embodiment, although the trigger signals ZA, ZB and ZC are low-active, that is to say the low level 0 on the signal lines corresponds to the ON state and the high level 1 corresponds to the OFF state, an embodiment with high-active trigger signals ZA, ZB and ZC is likewise also feasible. The microcontroller 1 has at least one interrupt input, seven port lines and three timers (not shown). The three timers for the microcontroller 1 are used to achieve separate and independent phase gating in the mains-system phases A, B and C, one timer being permanently allocated to each of the three mains-system phases A, B and C. The term phase gating in this case means a defined time delay between the voltage zero in one mains-system phase A, B or C of the connected three-phase mains system and the switching-on of the semiconductor valve 6A, 6B or 6C in the relevant mains-system phase, as is illustrated in FIG. 2, which is explained in the following text. Voltage zero detection devices 3A, 3B and 3C, which are connected to the mains-system phases A, B and C, are used to detect the voltage zeroes of the voltages UA, UB, UC of the individual mains-system phases A, B and C with respect to a synthetic star point 4, at which the voltage zero detection devices 3A, 3B and 3C are connected to one another as shown in FIG. 1. The voltage zero detection devices 3A, 3B and 3C, in this case, are designed such that they supply a high signal in response to voltage values above a positive voltage reference or below a negative voltage reference, and supply a low signal at the voltage zero in the individual mains-system phases A, B or C, that is to say when the voltage is less than the positive reference value or greater than the negative reference value. The voltage zero detection devices 3A, 3B and 3C form voltage zero signals U0A, U0B and U0C. These signals are supplied to the microcontroller 1 and to a logic device 5, which combines these three voltage zero signals U0A, U0B and U0C to form a common interrupt signal SI, which is passed to the interrupt input of the microcontroller 1. The interrupt input of the microcontroller 1, in this case, is designed to be negative-flank triggered so that each negative flank in the common interrupt signal SI triggers within the executive program in the microcontroller 1 an interrupt which is called a "voltage zero interrupt". However, in principle, positive flank triggering is also possible.

FIG. 2 shows the time waveforms of mains system variables and signals which are of interest for understanding the interrupt-controlled method for controlling a three-phase power controller according to the present invention. The three upper waveforms indicate the voltages UA, UB and UC, which are applied to the voltage zero detection devices 3A, 3B and 3C, of the individual mains-system phases A, B and C. The corresponding square-wave voltage zero signals U0A, U0B and U0C, which are produced by the voltage zero detection devices 3A, 3B and 3C, are shown underneath these first three waveforms. SI denotes the common interrupt signal formed in the logic device 5. On the basis of the negative flanks 11 of the common interrupt signal SI after assignment to the respective mains-system phase A, B or C having the voltage zero, that is to say the voltage zero signal U0A, U0B or U0C and once a predetermined time value 13A, 13B or 13C, respectively, has elapsed, a trigger signal is emitted in the relevant phases at the times 14A, 14B, 14C as can be seen from the waveforms denoted by ZA, ZB and ZC. This results in the current wave forms denoted by IA, IB and IC.

Figure 3:
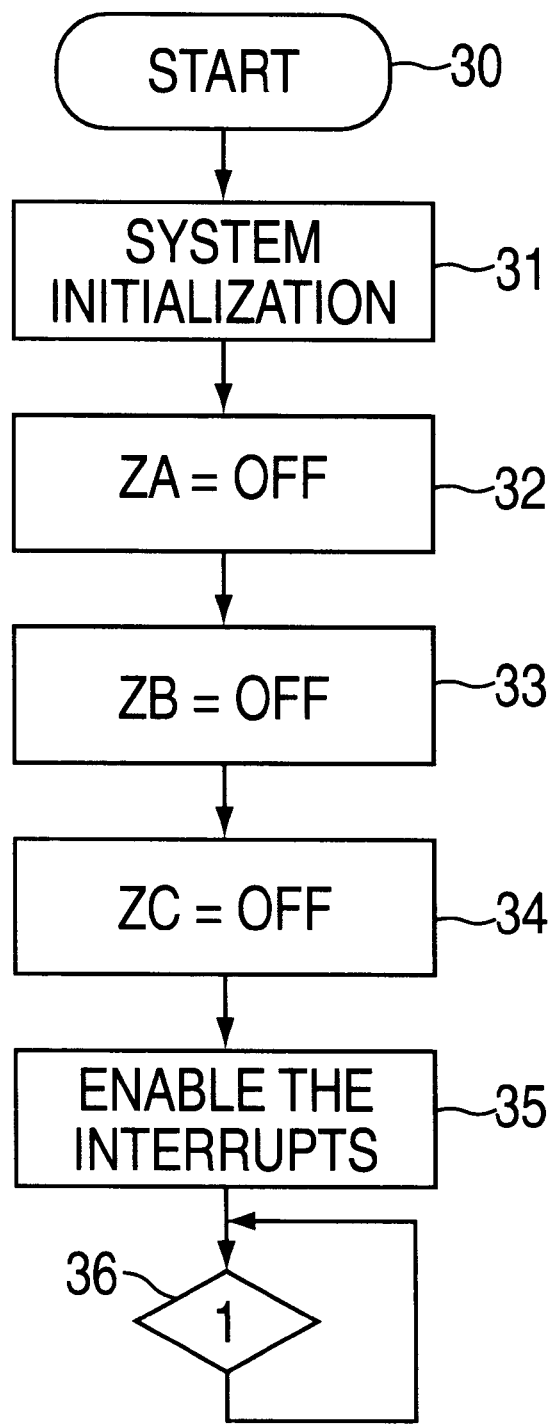
FIG. 3 shows the initialization routine with an endless loop in the interrupt-controlled method for controlling the three-phase power controller, applied to the three-phase power controller according to FIG. 1.

The executive program contained in the microcontroller 1 of the three-phase power controller operates using an interrupt-controlled method. This starts with an initialization routine according to FIG. 3, which shows the sequence in the microcontroller 1 from the switching on of the supply voltage for the microcontroller 1, denoted as the start 30 in the diagram, until an endless loop 36 is called. After the start 30, all the system initialization actions required for the method are carried out first, as stated in the block 31. Following this, all three trigger signals ZA, ZB and ZC are sent to the defined output state OFF, as shown by the blocks 32, 33 and 34. Once this has been done the interrupts used by the microcontroller 1 for the method are enabled in the block 35. Interrupt enabling is followed directly by the endless loop 36, in which the interrupt-controlled method is embedded and which runs until the supply voltage for the microcontroller 1 is switched off.

The sequence of the interrupt-controlled method for phase-gating control is described in the following text, by way of example, for the mains-system phase A. The phase-gating control actions in the mains-system phases B and C are carried out in a corresponding manner.

The interrupt-controlled method is initiated by the negative flank (denoted 11 in FIG. 2) in the common interrupt signal SI, with the voltage zero interrupt routine according to FIG. 4A, in the microcontroller 1. In the voltage zero interrupt routine in block 41, the first step is to evaluate the state of the control input signal ON denoted by 9 in FIG. 1. If a control input signal is activated, that is to say ON=0, the time value corresponding to a predetermined phase-gating value is calculated in the block 42. This value is then checked in the block 43 against a minimum value, which defines the time for ending the phase-gating control. The jump to end the phase-gating control is explained at the end of the description. Assuming that the minimum-value check gives a positive result, the next step of the voltage zero interrupt routine in the block 44 produces, via the condition U0A=0, the association between the initiating interrupt event, namely the negative flank in the common interrupt signal SI denoted by 11 in FIG. 1, and the voltage zero, denoted by 10A in FIG. 2, in the mains-system voltage UA. After confirming this association, the trigger signal ZA for the mains-system phase A is switched off in the block 46. It is admittedly not absolutely essential to switch off the trigger signal ZA at this time, which is denoted by 12A in FIG. 2, when the first phase-gating action takes place after the activation of the method by the control input ON denoted by the reference number 9, since the trigger signal ZA is already in the switched-off state by virtue of the assignment in the initialization routine before the first phase-gating action but, in order to simplify the software control structure, the trigger signal ZA or ZB and ZC is also switched off during the first phase-gating action.

Figure 4B:
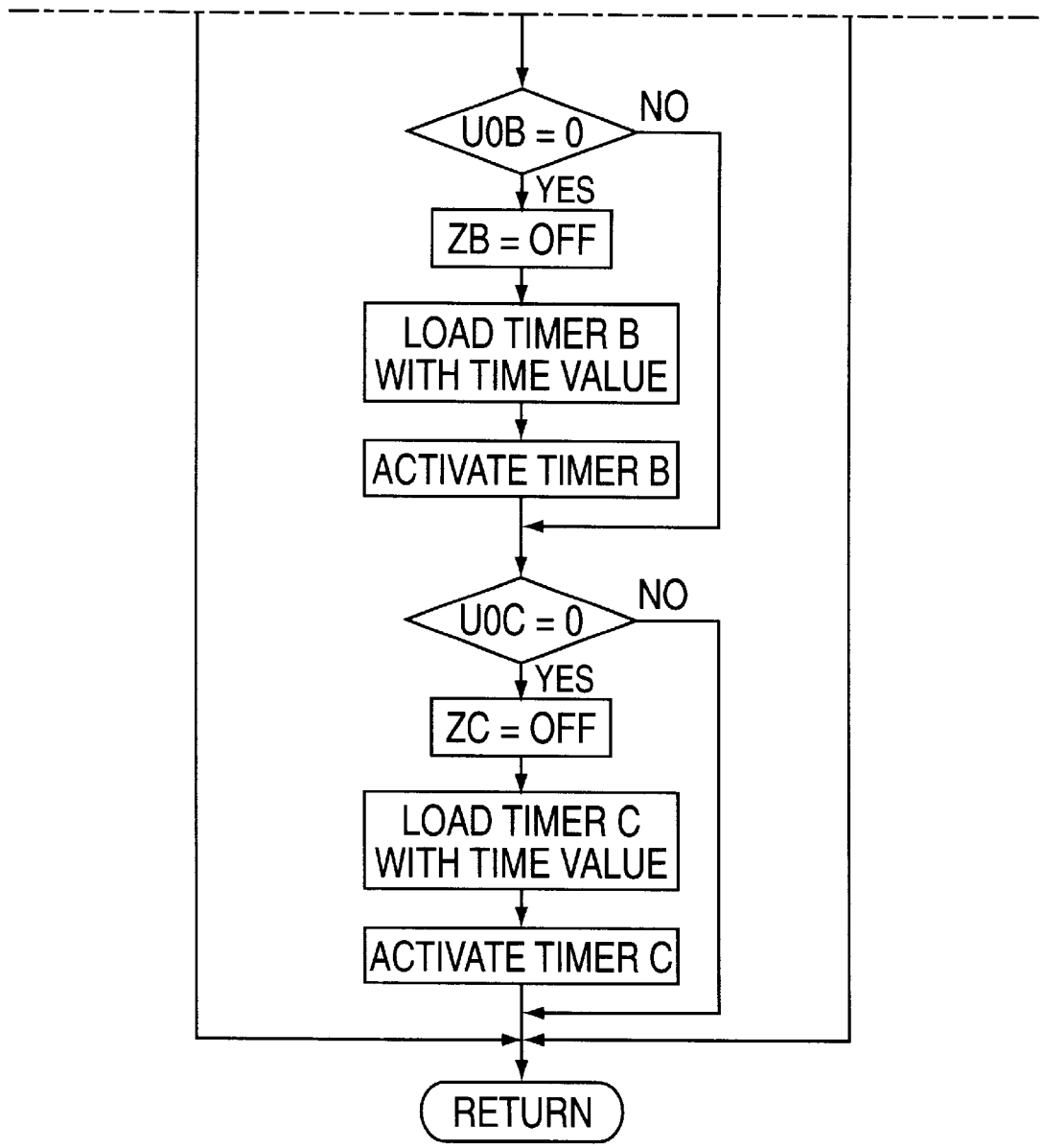
FIG. 4B shows a second portion of the voltage zero interrupt routine in the int errupt-controlled method for controlling the three-phase power controller of FIG. 4A.
Figure 7:
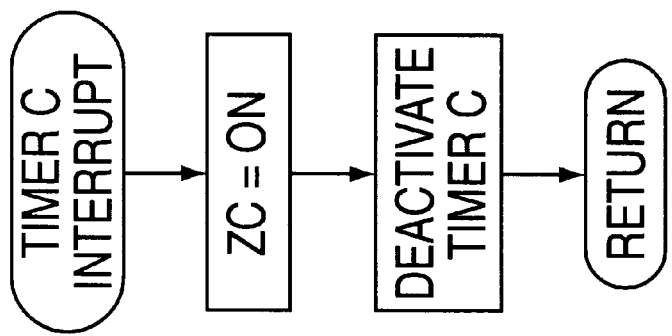
FIG. 7 shows a timer interrupt routine for a third phase for the interrupt controlled method for controlling the three-phase power controller.
Figure 6:
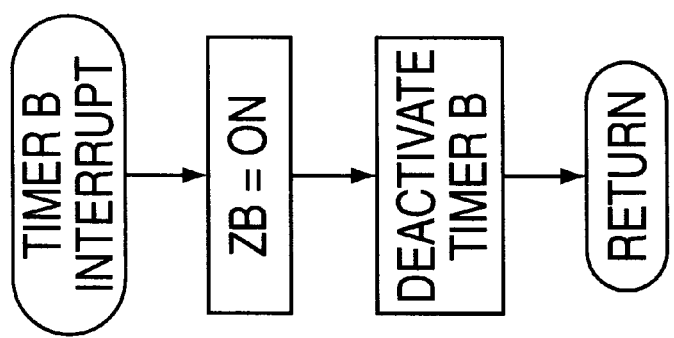
FIG. 6 shows a timer interrupt routine for a second phase for the interrupt controlled method for controlling the three-phase power controller.

Once the trigger signal ZA has been switched off, the timer associated with the mains-system phase A is loaded, in the block 49, with the previously calculated time value, and is activated in the subsequent block 52 and the voltage zero interrupt routine is then left once again via the questions U0B=0 and U0C=0 shown in FIG. 4B, which cannot be satisfied at the same time.

Figure 2:
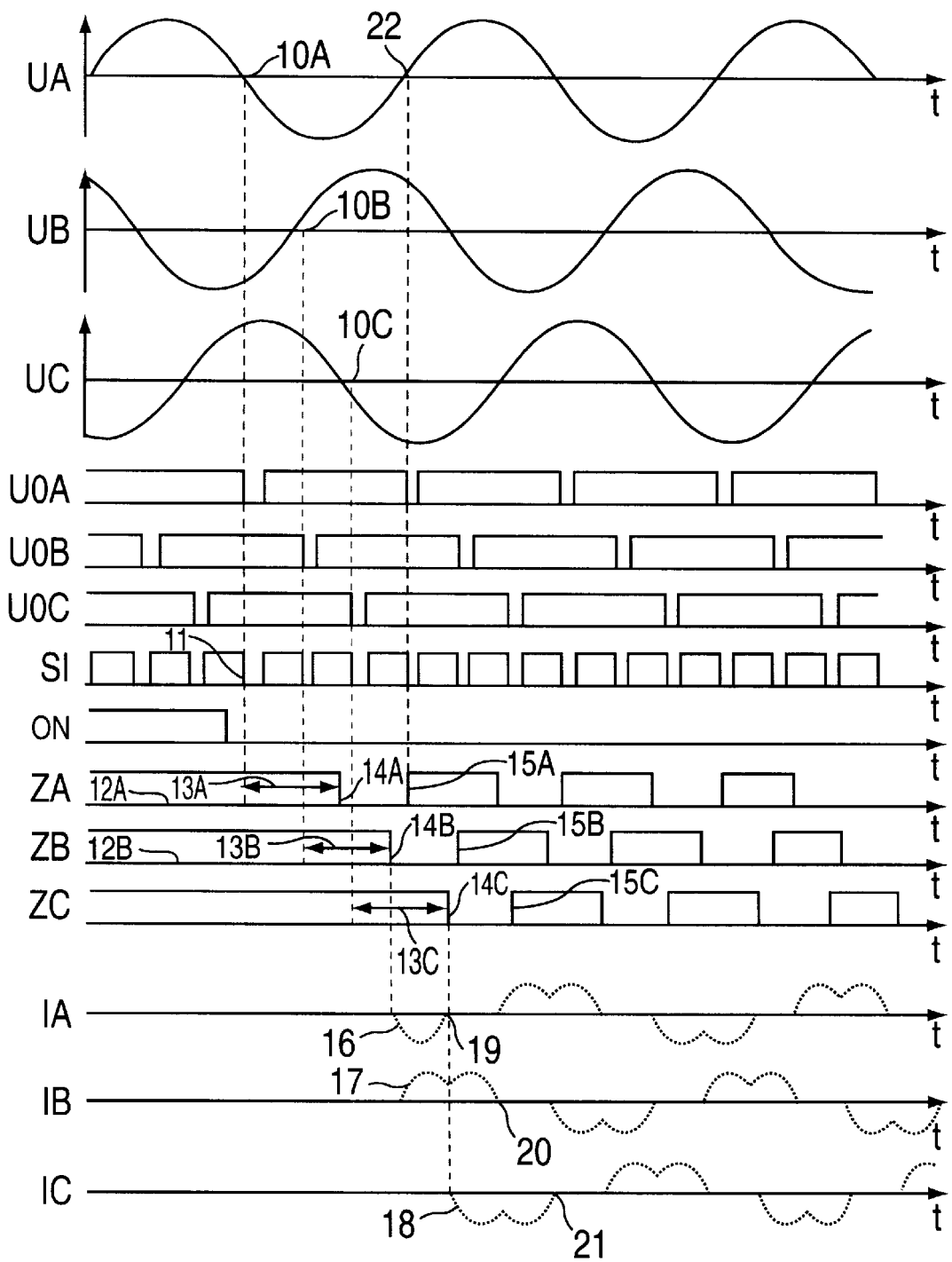
FIG. 2 shows the time waveforms of mains system variables and signals relating to the three-phase power controller according to FIG. 1.
Figure 5:
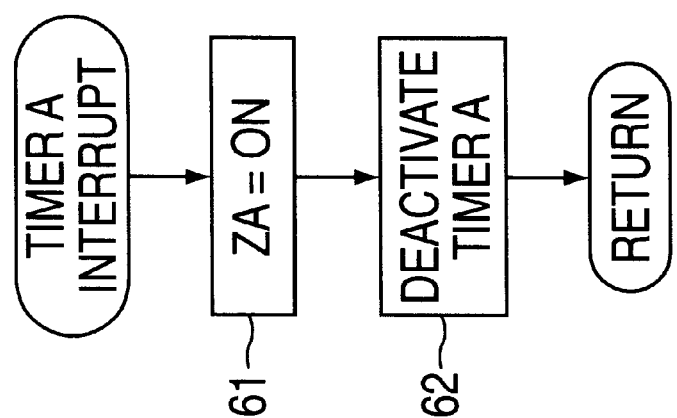
FIG. 5 shows a timer interrupt routine for a first phase for the interrupt controlled method for controlling the three-phase power controller.

Once the time value loaded into the timer for the mains-system phase A has elapsed, denoted by 13A in FIG. 2, this initiates an interrupt, and the microcontroller 1 makes a jump to a time interrupt routine for the mains-system phase A according to FIG. 5. In this routine, trigger signal ZA is switched on in the block 61, as a result of which the semiconductor valve 5A in the mains-system phase A is triggered via the trigger device 8A and the connecting line 7A. This time when the trigger signal ZA is switched on is denoted by 14a in the time waveform in FIG. 2. Before leaving this timer interrupt routine, the timer is deactivated again in the block 62.

The trigger signal ZA for the mains-system phase A remains switched on until the next voltage zero of the voltage UA, which is denoted by 22 here in FIG. 2. The associated switching-off of the trigger signal ZA at the time 15A is carried out in the voltage zero interrupt routine, which is initiated by this voltage zero, immediately before the associated timer is, according to block 49, loaded with the next phase-gating value or the corresponding time value. The time waveform illustrated in FIG. 2 for the trigger signal ZA of the semiconductor valve 6A is produced by the repetition of the described sequence.

The interrupt-controlled phase-gating control sequence described for the mains-system phase A is carried out in the same way for the mains-system phases B and C. This results in the corresponding time waveforms for the trigger signals ZB and ZC for the semiconductor valves 6B and 6C according to FIG. 2.

In a three-phase system without a neutral conductor, at least two phases must be switched on at the same time for any current to flow, that is to say a corresponding time overlap of two trigger signals ZA, ZB, ZC is required. Based on the three-phase mains-system phase sequence illustrated in FIG. 2, current first flows once the semiconductor valve 6B in the mains-system phase B has been switched on by the trigger signal ZB at the time 14B. Between the time 14B in the ZB waveform and the time 15A in the ZA waveform there is a time overlap when the trigger signals ZA and ZB are switched on, and this results in the current wave forms IA and IB with the current peaks 16 and 17 in the mains-system phases A and B.

The next time overlap of two switched-on trigger signals occurs from the time 14C in the ZC waveform to the time 15B in the ZB waveform, which results in the right-hand half of the current flow denoted by 17 in the mains-system phase B and the left-hand half of the current flow denoted by 18 in the IC waveform in the mains-system phase C. The splitting of the current waveforms into two sections is a result of the current flow being commutated, as a function of the phase-gating, from one pair of phases to another phases. In the case of the current flow denoted by 17, the current in the three-phase system commutates, for example as a result of the trigger signal ZC for the mains-system phase C being switched on at the time 14C, from the pair of phases AB to the pair of phases BC.

In order to achieve a time overlap of two switched-on trigger signals, the trigger signal of the second mains-system phase involved must always be switched on, for example at the time 14B, before the trigger signal for the first mains-system phase to be switched on is switched off, for example at the time 15A. In order to satisfy this condition, the phase-gating value must always be less than 120° electrical. This is obvious from the fact that, for example in the case of a balanced three-phase mains system, the loading of the timer with the time value 13B for phase gating of the second mains-system phase involved, at the time 12B always takes place 60° after the loading of the time value 13A for the phase-gating value of the first mains phase involved, at the time 12A, and as a result of the fact that the trigger signal ZA of the mains-system phase A that is the first to be switched on is switched off at the time 15A, always 180° after the time 12A.

Due to the inductive elements when motor windings are connected, the end of the current flow within a mains-system phase, denoted by 19, 20 and 21, for example, in FIG. 2, never takes place at the same time as or at a time before the trigger signal in this mains-system phase is switched off, for example at the times 15A, 15B or 15C, but always with a time delay with respect to the time at which the trigger signal is switched off. Due to this characteristic of the current waveforms and the switching-off of the trigger signal for the semiconductor valve whenever a voltage zero occurs in a mains-system phase, double or multiple triggering within one half-cycle of a mains-system phase, which is denoted for example by the start time 10A and the end time 22 in the waveform of the phase voltage UA, can be virtually precluded. The duration of the time delay between the end of the current flow and the switching-off of the trigger signal, in this case, is dependent on the inductive element of the motor winding, which varies dynamically while the connected motor is accelerating from rest to the rated speed.

The described sequence of interrupt-controlled phase-gating control repeats itself with a phase-gating value which, in each case, is reduced by a predetermined step width, until the time value which corresponds to the phase-gating value falls below a permanently specified minimum value, which is checked in the voltage zero interrupt routine according to block 43 in FIG. 4. At the same time, for example, a connected motor 2 as the load accelerates smoothly from rest to the rated speed, in which case it is possible to vary the soft starting time of the motor 2 by selecting the step width for the reduction in the phase-gating value. Once the permanently specified minimum value for phase gating has been reached, which minimum value is chosen such that the connecting motor 2 has undoubtedly accelerated by the time this minimum value is reached, the three semiconductor valves 6A, 6B and 6C are driven without any phase gating by the trigger signals ZA, ZB and ZC being switched on directly in the blocks 47, 50 and 53.

Figure 1:
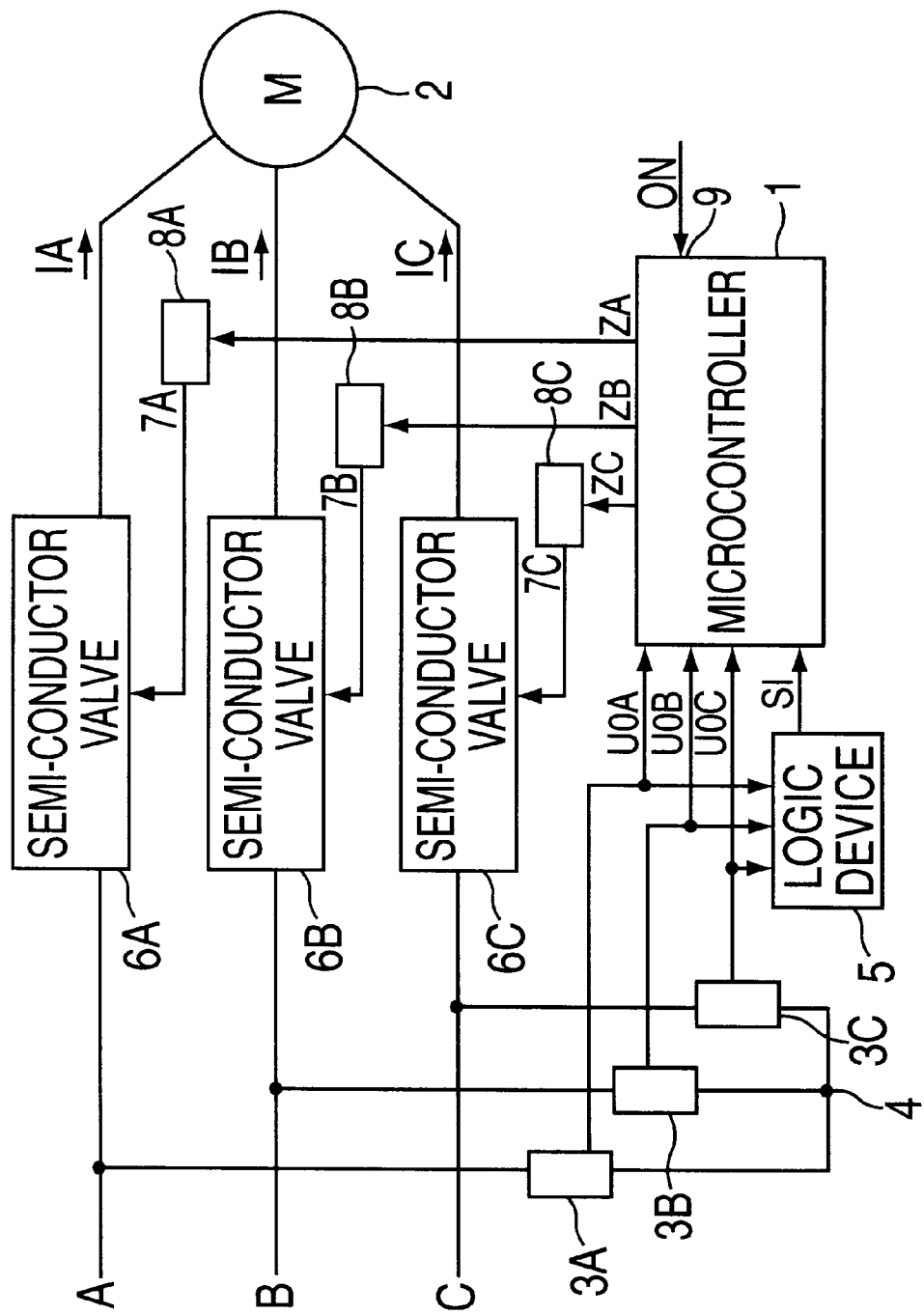
FIG. 1 shows a simplified circuit diagram of a three-phase power controller for controlling, for example, a three-phase asynchronous motor.

By applying the value 1 to the control input ON of the microcontroller 1, denoted by the reference number 9 in FIG. 1, the motor can be switched off at any time during the soft-starting process or during direct drive without phase-gating. In this case, all three trigger signals ZA, ZB and ZC are switched off directly in blocks 45, 48 and 51 and, in the block 54, the phase-gating value of the next soft-starting process is reset to the predetermined start value for phase gating.

Since, due to the fact that they are derived directly from the voltage zeroes 10A, 10B and 10C of the phase voltages UA, UB and UC, the trigger signals ZA, ZB and ZC for the individual mains-system phases A, B and C always automatically have to follow the phase sequence dictated by the three-phase system, the interrupt-controlled method proposed here for phase-gating control is independent of the rotation direction.

Figure 8:
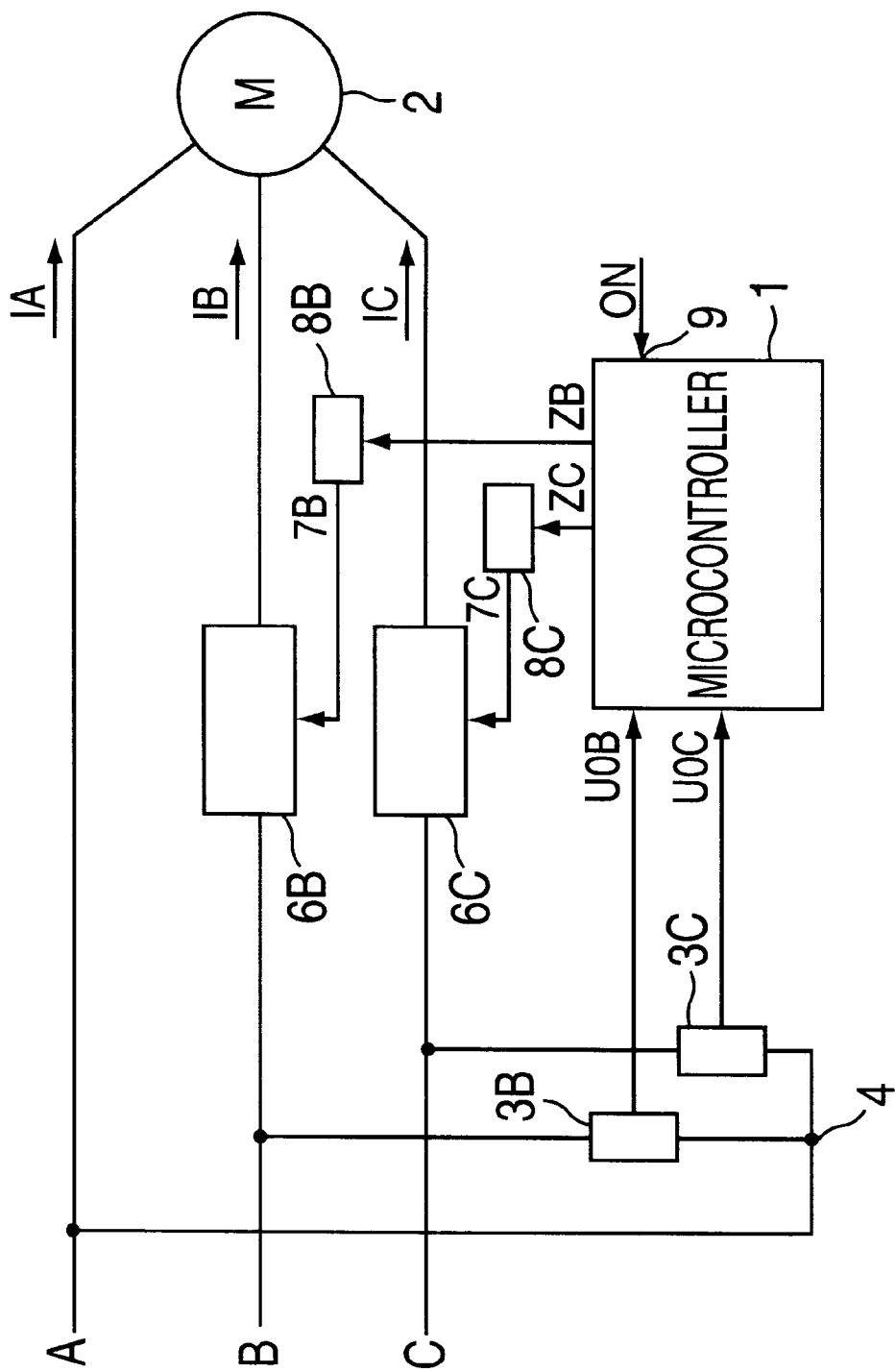
FIG. 8 shows a simplified illustration of a circuit of a three-phase power controller with two voltage zero detection devices.

A second exemplary embodiment of the present invention is explained in the following text with reference to FIGS. 8–15. The phase-gating control is carried out here using two semiconductor valves 6B and 6C in the mains-system phases B and C. The three-phase power controller in this case operates with two voltage zero detection devices 3B and 3C, which are connected between the mains-system phases B and C on one side and the synthetic star point 4 on the other side, the star point 4 being linked to the mains-system phase A. The voltage zero signals U0B and U0C formed by the voltage zero detection devices 3B and 3C are in this case passed directly to interrupt inputs of the microcontroller 1. In this embodiment, the microcontroller 1 has to have at least two interrupt inputs, three port lines and two timers. The circuit for two-phase control systems for a three-phase power controller according to FIG. 8 is otherwise in principle of identical design to that for the three-phase control system according to FIG. 1. The two timers are required for carrying out the phase gating separately and independently in the two controlled mains-system phases B and C. In this case, a timer is permanently allocated to each of the two controlled mains-system phases B and C. The term phase-gating in this context means a defined time delay between the voltage zero of a mains-system phase B or C in the three-phase mains system and the switching-on of the semiconductor valve 6B or 6C as is denoted, for example, by 13A and 13B in the signal waveforms ZB and ZC in FIG. 9.

Figure 9:
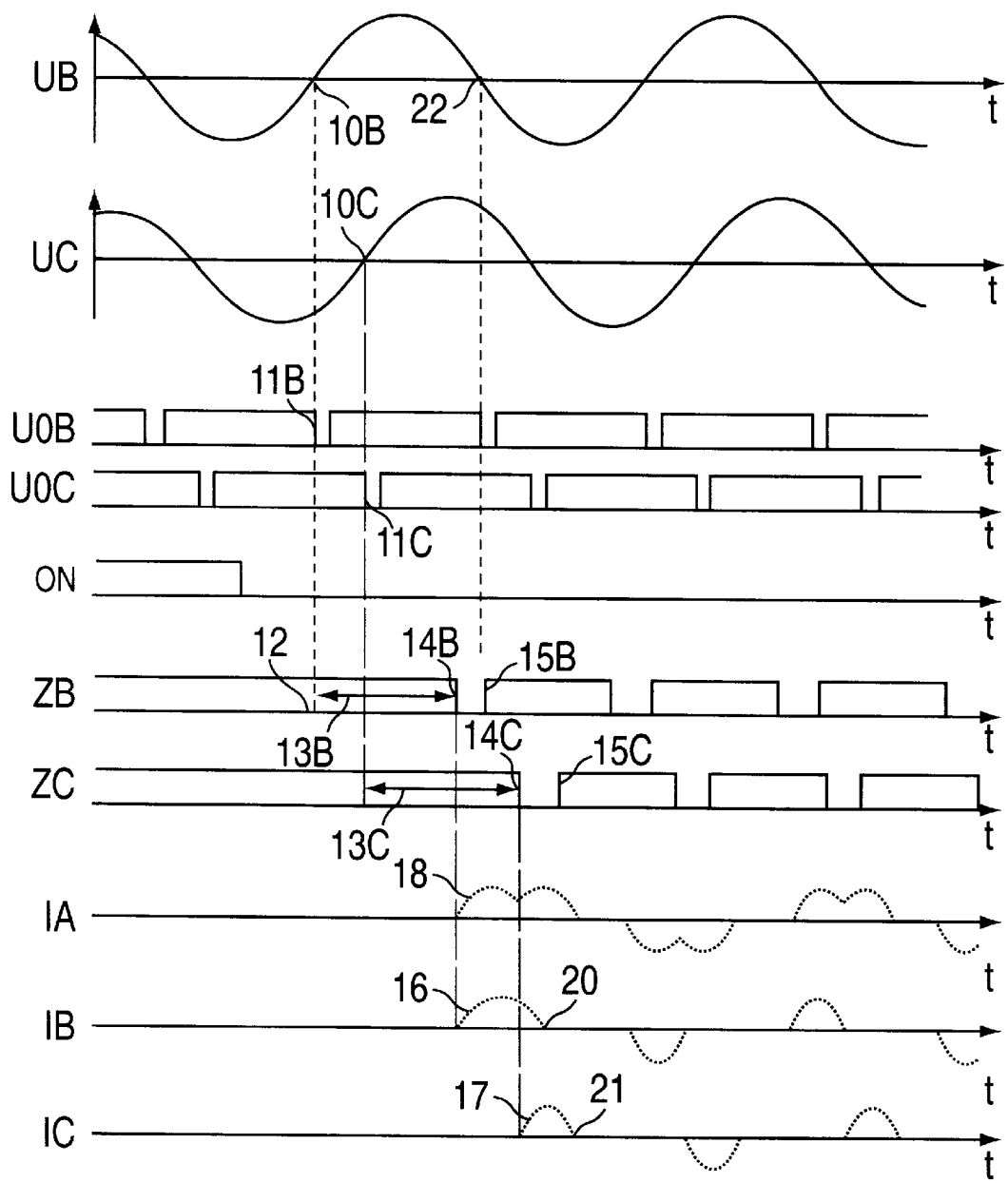
FIG. 9 shows mains system variables as well as signals relating to the operation of the three-phase power controller according to FIG. 8.

FIG. 9 shows the time waveforms of the voltages UB and UC applied to the voltage zero detection devices 3B and 3C. Of these, the voltage zero signals formed by the voltage zero detection devices 3B and 3C are denoted by U0B and U0C. Their negative flanks are denoted by 11B and 11C. This is followed by the ON signal by means of which the two-phase interrupt-controlled method for phase-gating control can be activated or deactivated at any time via the low-active control input 9 of the microcontroller 1. The two next wave forms show the trigger signals ZB and ZC. IA, IB and IC represent the current waveforms in the mains-system phases A, B and C.

FIG. 10 shows the initialization routine of the microcontroller 1. This initialization routine covers the sequence from switching on the supply voltage for the microcontroller 1, denoted by the block 30, until an endless loop 36 is called, in which the two-phase interrupt-controlled control method proposed here is embedded. This initialization routine corresponds to that already shown in FIG. 3, with the exception that, in this case, only the two trigger signals ZB and ZC that are used are set to the defined output state OFF before the interrupts which are used for the method in the microcontroller 1 are enabled.

Figure 13:
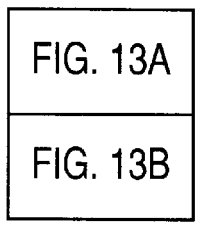
FIG. 13A shows a first portion of a triggering routine for the interrupt-controlled method for controlling the three-phase power controller according to FIG. 8.
FIG. 13B shows a second portion of a triggering routine for the interrupt-controlled method of FIG. 13A for controlling the three-phase power controller according to FIG. 8.
Figure 13A:
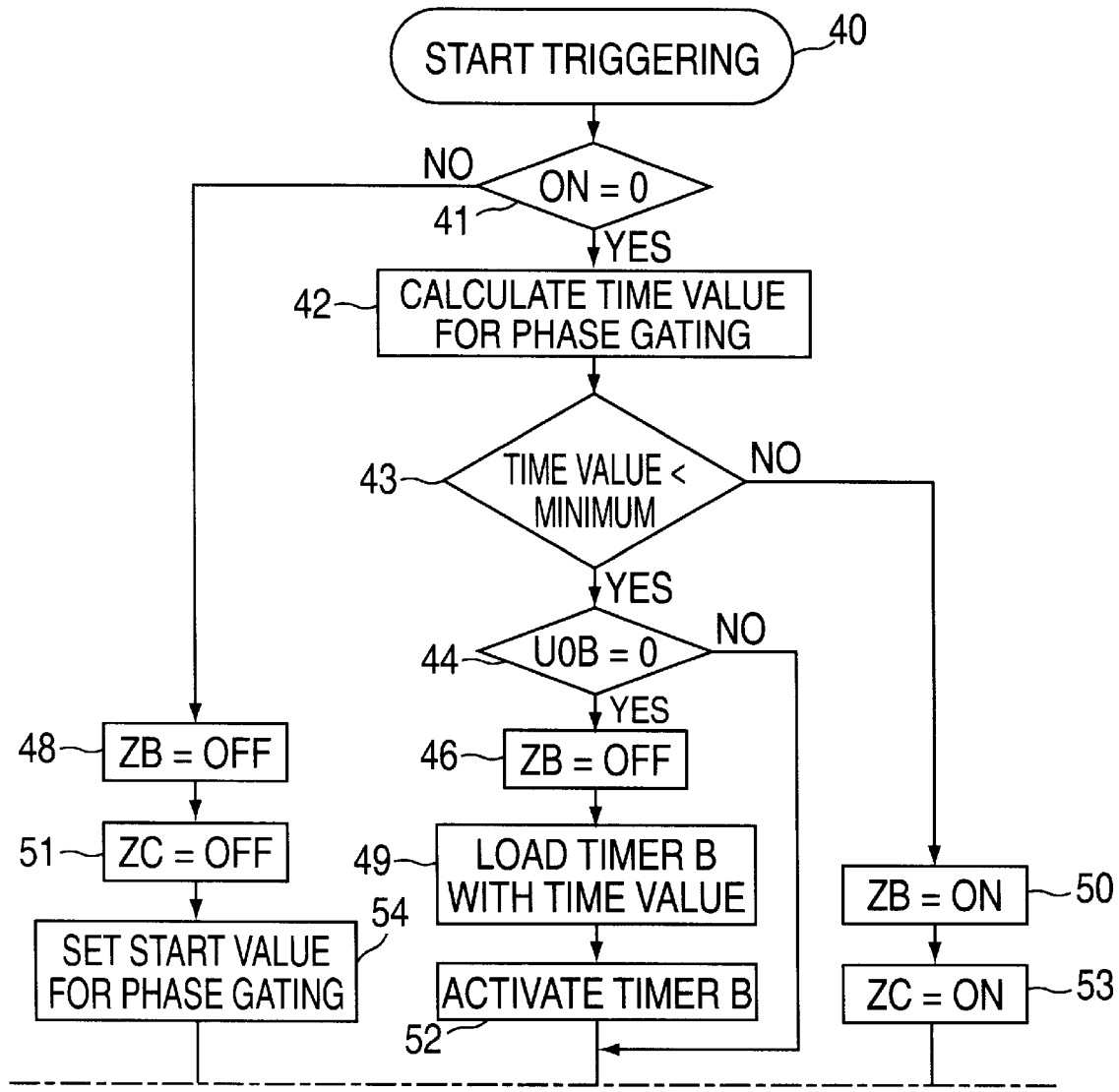

The following description of the interrupt-controlled method for phase-gating control relates, by way of example, to the mains-system phase B. The voltage zero interrupt U0B according to FIG. 11 is initiated in the microcontroller 1 by the negative flank (which is denoted by 11B in FIG. 9) in the signal waveform in the voltage zero signal U0B. The flank 11B is in this case caused by the voltage zero 10B of the mains-system voltage UB. After jumping to the voltage zero interrupt routine, the "triggering" routine is called up and processed in block 37 in this routine, before the interrupt routine jumps back, via the return instruction, to the endless loop of the microcontroller 1. In the "triggering" routine according to FIGS. 13A and 13B, once the routine has started in the block 40, the state of the control input signal ON is first of all evaluated in the block 41. If a control signal ON=0 has been activated, the time value corresponding to a predetermined phase-gating value is first of all calculated, in the block 42, for the mains-system phase B. This time value is checked in block 43 against a minimum value, which determines the time for ending the phase-gating control process, as will be explained at a later point.

In the next step in the routine, the condition U0B=0 is used in the block 44 to associate the mains-system phase B with the initiating interrupt event, denoted by the negative flank 11B in the voltage zero signal U0B and the voltage zero denoted by 10B in the mains-system phase B. Once this association has been made, the trigger signal ZB for the mains-system phase B is then first switched off in the block 46. Admittedly, it is not absolutely essential to switch the trigger signal ZB at the time 12 during the first phase-gating action after activation of the method by the control input ON, since, as a result of the association in block 33, the trigger signal is in the switched-off state before the first phase-gating action but, in order to simplify the software control structure, the trigger signal ZB or ZC is also switched off during the first phase-gating action.

Once the trigger signal ZB has been switched off, the timer associated with the mains-system phase B is loaded, in 49, with the time value calculated in block 42 and, in the block 52, the timer is activated and the routine is then left again via the question U0C=0, which cannot be satisfied at the same time. Once the time value 13B, which is loaded in the timer according to FIG. 9 has elapsed, this initiates an interrupt, at which point a jump is made to the timer interrupt routine illustrated in FIG. 14. In this timer interrupt routine, the trigger signal ZB is switched on in the block 61, as a result of which semiconductor valve 5B is triggered via the trigger device 8B and connecting line 7B of the semiconductor valve 6B in the mains-system phase B. This time when the trigger signal ZB is switched on is denoted by 14B in the time waveform of ZB in FIG. 9. Before leaving the timer interrupt routine, the timer for the relevant mains-system phase is inactivated again, in the block 62.

The trigger signal ZB then remains switched on all the time until the next voltage zero 22 according to FIG. 9. The associated switching-off of the trigger signal ZB at the time 15B in this case takes place in the "triggering" routine, which is called by the voltage zero interrupt routine U0B, immediately before the relevant timer is loaded, in the block 49, with the next phase-gating value. The repetition of the described sequence results in the time waveform illustrated in FIG. 9 for the trigger signal ZB of the semiconductor valve 6B.

Figure 13B:
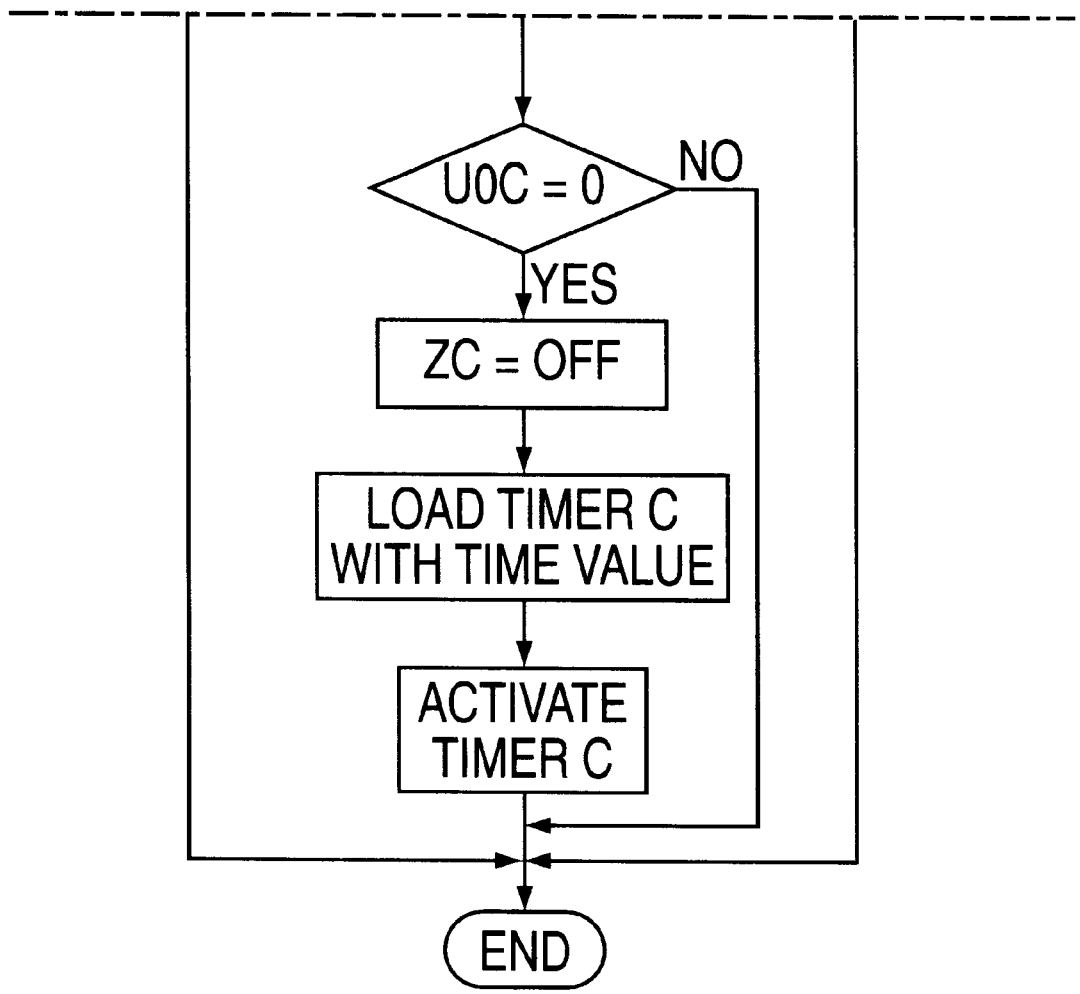
Figure 15:
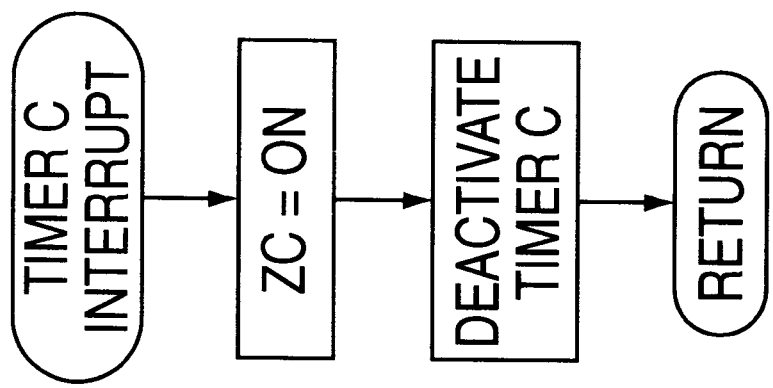
FIG. 15 shows a timer-interrupt routine for a second phase for the interrupt-controlled method for controlling the three-phase power controller according to FIG. 8.
Figure 14:
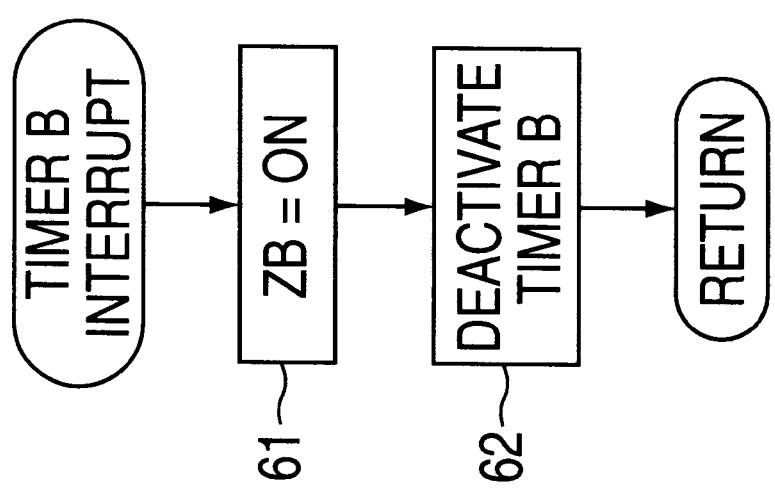
FIG. 14 shows a timer-interrupt routine for a first phase for the interrupt-controlled method for controlling the three-phase power controller according to FIG. 8.

This interrupt-control sequence, which has been described for the mains-system phase B, for producing phase-gating control is carried out in the same way in the mains-system phase C, with the sole difference that the voltage zero interrupt is in this case initiated by a negative flank 11C in the voltage zero signal U0C, and a jump is made to the voltage zero interrupt routine U0C illustrated in FIG. 12. The "triggering" routine is once again called there, in the block 37, and the already described sequence is carried out for the mains-system phase C as shown in FIGS. 13B and 15. This results in the time waveform ZC which is illustrated in FIG. 9 for the trigger signal of the semiconductor valve 6C.

In the case of a phase-gating control system designed for two phases, one phase of the three-phase mains system that is connected to the load is not controlled and is thus always switched on. The condition that at least two mains-system phases must be switched on at the same time for any current to flow in the main-system phases in a three-phase system without a neutral conductor is thus satisfied at all times by the phase-gating control system designed for two phases.

In contrast to the phase-gating control system designed for three phases, the problem of initial triggering thus does not arise in the case of a phase-gating control system designed for two phases, the problem otherwise requiring that control-engineering measures always have to be adopted to ensure that two phases are always switched on at the same time in order that a current flow in the phases is possible.

In the case of the exemplary embodiment of a two-phase phase-gating control system described here, the mains-system phase A of the three-phase mains system connected to the load is always switched on. Based on the sequence of mains-system phases B and C and the three-phase mains system illustrated in FIG. 9, the first current flow thus takes place once the semiconductor valve 6B has been switched on by the trigger signal ZB at the time 14B. This first triggering at the time 14B results in the current flow denoted by 16 in the waveform of IB in the mains-system phase B. The second triggering at the time 14C in the mains-system phase C causes the current flow denoted by 17 in the waveform of IC in phase C. The resultant current flow in the uncontrolled mains-system phase A, which is denoted by 18 in the waveform of IA, in this case is respectively composed of the current flow elements in the controlled mains-system phases B and C.

Due to the inductive element of the connected motor windings, the end of the current flow in a controlled mains-system phase, for example denoted by 20 and 21, never takes place at the same time or at a time before the switching-off of the trigger signal for this mains-system phase, for example at the times 15B or 15C, but always with a time delay with respect to the switching-off of the trigger signal. As a result of this characteristic of the current waveforms and the switching-off of the trigger signal for a semiconductor valve, whenever a voltage zero occurs in a mains-system phase, double or multiple triggering within one phase half-cycle, which is denoted for example by the start time 10B and the end time 22 in the waveform of the phase voltage UB, can virtually be precluded. The duration of the time delay of the current flow end with respect to the switching-off of the trigger signal, in this case, is dependent on the inductive element of the motor winding, which varies dynamically while the connected motor is accelerating from rest to the rated speed.

By calculating the phase-gating values in the two controlled mains-system phases using functions with different profiles, it is possible to influence the imbalance in the current waveforms of the three mains-system phases caused by the two-phase phase-gating control system.

The described sequence of two-phase interrupt-controlled phase-gating control, in each case, is repeated, as in the case of three-phase control, with phase-gating values in each case reduced by predetermined step widths, until one of the two time values, which correspond to the phase-gating values falls, below a permanently predetermined minimum value. The motor 2, two phases of which are driven via the semiconductor valves 6A and 6B, in this case accelerates softly from rest to the rated speed, in which case it is possible to vary the soft starting time of the motor via the choice of the step widths for the reduction of the phase-gating values. After reaching the permanently predetermined minimum value for phase gating, which is chosen such that the connected motor 2 has undoubtedly accelerated by the time this minimum value is reached, the two semiconductor valves 6A and 6B are driven without phase gating, by directly switching on the trigger signals ZB and ZC in the blocks 50 and 53.

By applying the value 1 to the control input ON of the microcontroller 1, the motor 2 can be switched off at any time during the soft starting or during direct drive without phase gating. The two trigger signals ZB and ZC, in this case, are switched off directly by the blocks 48 and 51 and, in the block 54, the phase-gating values for the next soft starting process are reset to the predetermined start values for phase gating.

Since, due to the fact that the trigger signals are derived directly from the voltage zeroes 10B and 10C of the two controlled mains-system phases of the three-phase mains system, the trigger signals of the two controlled mains-system phases always automatically have to follow the predetermined phase sequence, the interrupt-controlled method proposed here for two-phase phase-gating control of a three-phase power controller operates independently of the rotation direction.

Although the present invention has been explained with reference to the embodiments illustrated in FIGS. 1 to 15, it should be remembered that this is not intended to limit the present invention to just the illustrated embodiments, but to include all possible changes, modifications and equivalent arrangements to the extent that they are within the scope of the present invention.

What is claimed is:

1. A three-phase power controller for controlling a load connected to a three-phase mains system, comprising:
    voltage detection devices producing voltage zero signals corresponding to voltage zeroes in individual phases of the three-phase mains system, the voltage zero signals being square-wave signals having flanks;
    semiconductor valves corresponding to the individual phases of the three-phase mains system;
    a microcontroller deriving trigger signals as a function of the voltage zero signals for driving the semiconductor valves and executing an executive program, the executive program being interrupt controlled as a function of the flanks of the voltage zero signals, the microcontroller further executing a set of interrupt routines associated with the interrupt control of the executive program, the set of interrupt routines controlling switch-on times for the trigger signals as a function of the voltage zeroes and switching off the trigger signals directly after each of the voltage zeroes in the individual phases of the three-phase mains system.

2. The three-phase power controller according to claim 1, wherein the voltage detection devices includes only two voltage detection devices producing two voltage zero signals corresponding to the voltage zeroes in two phases of the three-phase mains system.

3. The three-phase power controller according to claim 1, further comprising:
    a logic device forming a common interrupt signal as a function of the voltage zero signals and supplying the common interrupt signal to the microcontroller for interrupt controlling t he executive program.

4. The three-phase power controller according to claim 1, wherein the interrupt control of the executive program includes a voltage zero interrupt routine, wherein the voltage zero interrupt routine loads one of a plurality of timers associated with one of the semiconductor valves with a predetermined time value and activates the one of the plurality of timers, and wherein the one of the semiconductor valves is triggered when the predetermined time value elapses.

5. The three-phase power controller according to claim 4, where in the voltage zero interrupt routine switches off one of the trigger signals before loading the one of the plurality of timers.

6. The three-phase power controller according to claim 4, wherein the voltage zero interrupt routine deactivates the one of the plurality of timers.

7. The three-phase power controller according to claim 4, further comprising:

a logic device forming a common interrupt signal as a function of the voltage zero signals and supplying the common interrupt signal to the microcontroller for interrupt controlling the executive program, the common interrupt signal having a flank, wherein the voltage zero interrupt routine produces an association between the flank of the common interrupt signal and one of the voltage zero signals.

8. A method for phase-gating a control of a three-phase power controller to control a three-phase load, the three-phase load being connected to a three-phase mains system, the three-phase mains system having a plurality of phases, the method comprising the steps of:

producing voltage zero signals corresponding to voltage zeroes in the plurality of phases of the three-phase mains system, the voltage zero signals being square-wave signals having flanks;

deriving trigger signals as a function of the voltage zero signals;

driving semiconductor valves as a function of the trigger signals;

combining via a logic device the voltage zero signals to form a common interrupt signal, the common interrupt signal having a negative flank and a positive flank;

jumping to an interrupt routine on at least one of the negative flank and the positive flank;

assigning one of the triggering voltage zeroes to one of the plurality of phases of the three-phase mains system in the interrupt routine; and initiating a timer-interrupt-controlled sequence for the one of the plurality of phases of the three-phase mains system to produce one of the trigger signals for one of the phase-related semiconductor valves for the one of the plurality of phases of the three-phase mains system.

* * * * *